United States Patent [19]
Styron

[11] Patent Number: 6,009,169
[45] Date of Patent: Dec. 28, 1999

[54] INMATE PHONE

[76] Inventor: Mark Styron, 3719 Moonlite Dr., Pasadena, Tex. 77505

[21] Appl. No.: 09/017,982

[22] Filed: Feb. 3, 1998

[51] Int. Cl.$^6$ ..................................................... H04M 1/00
[52] U.S. Cl. ........................................... 379/453; 379/420
[58] Field of Search .................................... 379/428, 447, 379/453, 420, 446, 454, 455

[56] References Cited

U.S. PATENT DOCUMENTS

| | | |
|---|---|---|
| 2,277,907 | 3/1942 | DePonte . |
| 2,844,659 | 7/1958 | Shaw ....................................... 379/420 |
| 3,144,513 | 8/1964 | Sherron . |
| 4,101,735 | 7/1978 | Bridenbaugh . |
| 4,104,485 | 8/1978 | Pessel et al. . |

*Primary Examiner*—Jack Chiang
*Attorney, Agent, or Firm*—Michael I Kroll

[57] ABSTRACT

An inmate phone (10) of the type having a housing (12) in an interior wall (14) of a prison (16). A push-button dialing pad (18) is mounted within a front wall (20) of the housing (12) with the push-button digits (22) of the push-button dialing pad (18) extending out of the front wall (20). A telephone handset (24) is provided, being a handle (26) with an earpiece (28) at one end and a mouthpiece (30) at an opposite end. A handset cord (32) is electrically connected between the push-button dialing pad (18) and the telephone handset (24). The improvement comprises a facility (34) for permanently mounting the telephone handset (24) vertically within the front wall (20) of the housing (12), so that the earpiece (28) positioned at top and the mouthpiece (30) positioned at bottom will permanently extend out through the front wall (20) of the housing (12) to be used by inmates within the prison (16) hands free. The handset cord (32) is permanently maintained within the housing (12), to prevent the inmates from having direct access to the telephone handset (24) and the handset cord (32), in which the inmates can no longer hang themselves with the handset cord (32) and break the handset cord (32) off and use the telephone handset (24) as a weapon.

21 Claims, 3 Drawing Sheets

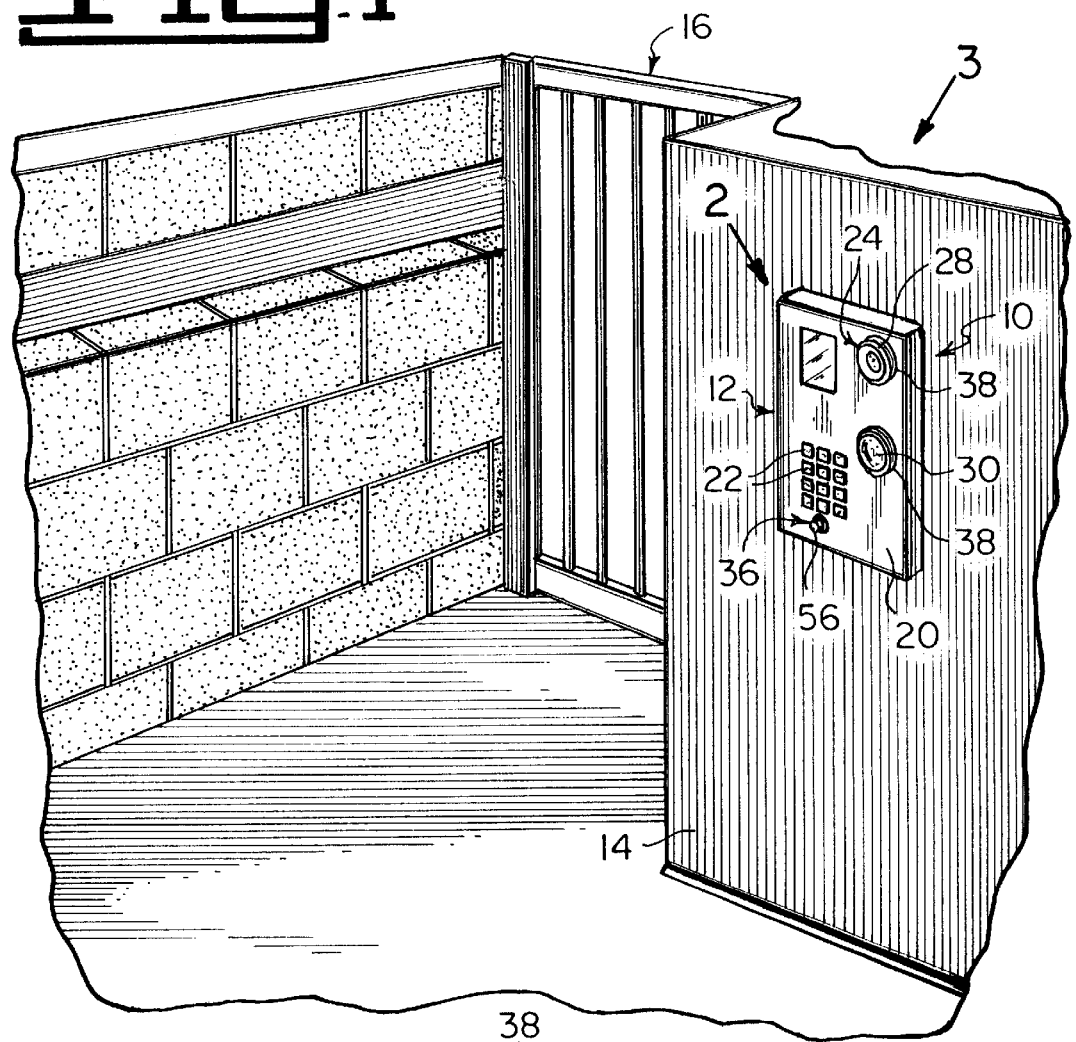
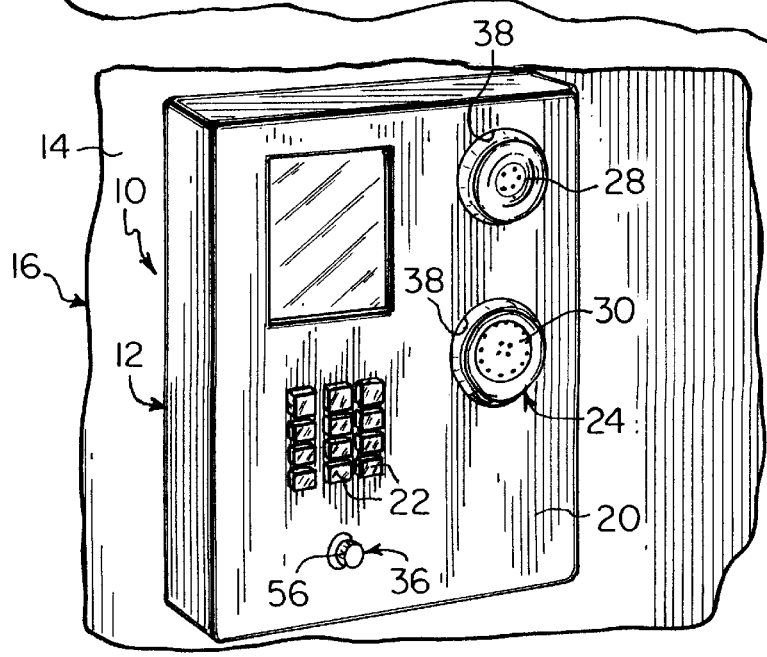

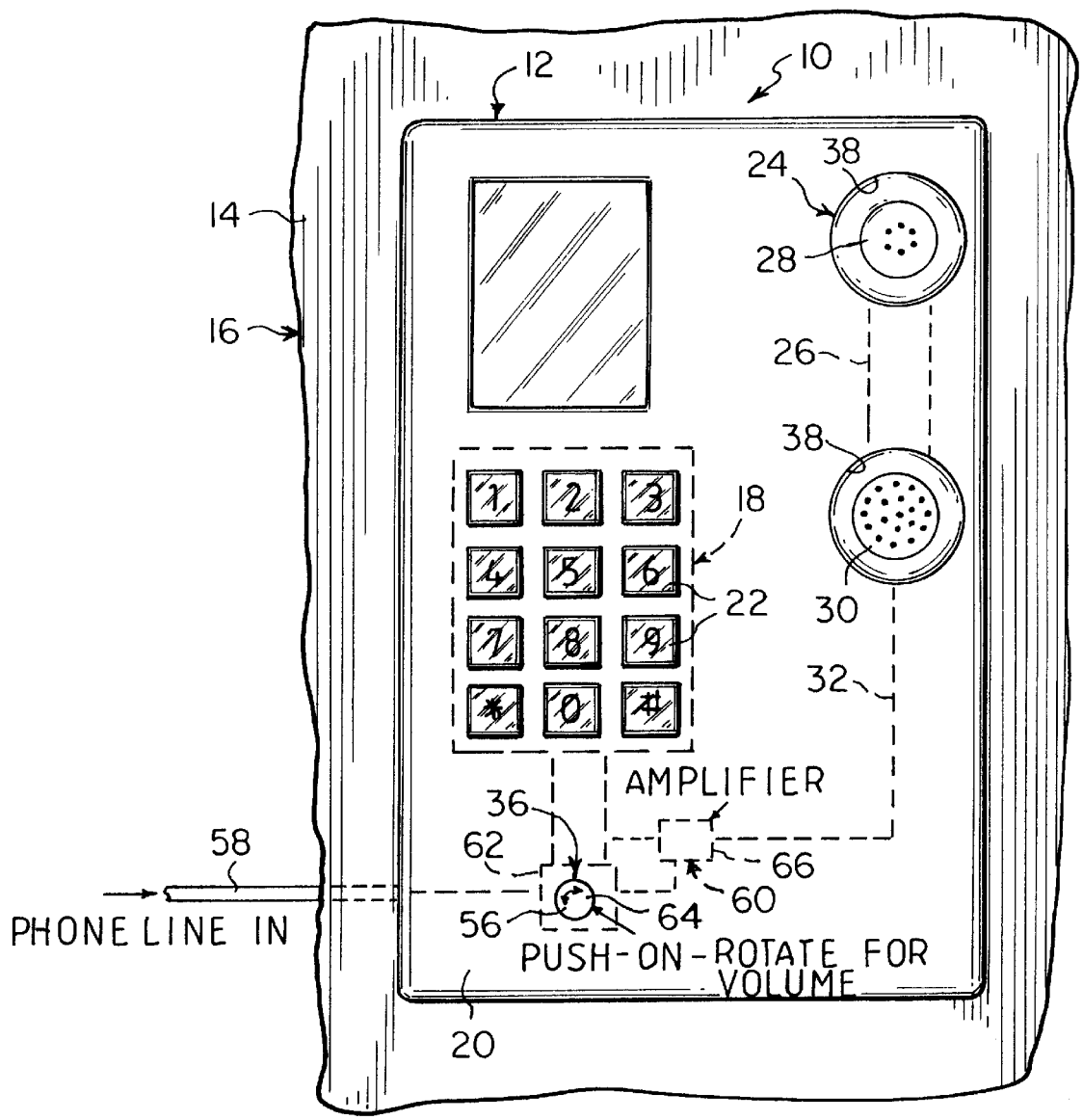

INMATE PHONE

BACKGROUND OF THE INVENTION

1. Field of the Invention

The instant invention relates generally to telephone equipment and more specifically it relates to an inmate phone. The inmate phone contains a conventional telephone handset and handset cord permanently mounted within a telephone housing on a wall with the earpiece and mouthpiece of the telephone handset extending through the housing to serve as a hands-free telephone for safety. The inmates within a prison can no longer hang themselves with the handset cord or break the handset cord off and use the telephone handset as a weapon. It will also reduce repair by eliminating the need to fix and replace the telephone handset, thereby saving money for the cost of maintenance thereof.

2. Description of the Prior Art

Numerous telephone equipment have been provided in prior art. For example, U.S. Pat. Nos. 2,277,907 to Goodale, Jr. et al.; 3,144,513 to Sherron; 4,101,735 to Bridenbaugh and 4,104,485 to Pessel et al. all are illustrative of such prior art. While these units may be suitable for the particular purpose to which they address, they would not be as suitable for the purposes of the present invention as heretofore described.

GOODALE, JR., WALTER D.

HERCKMANS, ALFRED

TILLMAN, RICHARD J.

TELEPHONE SET

U.S. Pat. No. 2,277,907

A distant talking and listening telephone set comprising a support having a base portion for placement on a desk or table. A bidirectional transmitter is mounted on the support. A loud-speaking receiver means is also mounted on the support between the transmitter and the base and is oriented to deliver substantially equal sound energy to both sides of the transmitter, whereby the net acoustic effect of the receiver means on the transmitter is zero.

SHERRON, PERCIVAL H.

TELEPHONE BOOTH

U.S. Pat. No. 3,144,513

In combination, a telephone booth comprising an outer shell having upright walls. Sound absorbing material isarranged within the shell to form an absorption chamber having upright walls. A means extends across the booth and closes the top of the shell and chamber. The front of the booth is permanently open to afford ingress to and egress from the chamber. A loud speaking telephone set is provided, comprising a microphone and a plurality of loud-speakers. The microphone and loud-speakers are mounted in the walls of and so as to face the center of the chamber. The loud-speakers face away from the microphone. A means is for operatively connecting the microphone and loud-speakers to a telephone line.

BRIDENBAUGH, EDWIN REDMOND

TWO-WAY LOUD SPEAKING DEVICE FOR TELEPHONE STATIONS

U.S. Pat. No. 4,101,735

A hands free telephone set uses a single transducer as microphone and speaker. A switching arrangement senses and compares the relative strength between received and transmit signals, and switches signal paths accordingly. By sensing the input of the receive path versus the output of the transmit path, the detectors are thus asymmetrically coupled, to provide a break-in capability from one side (the telephone central or calling party) only.

PESSEL, DAVID

WILHELM, NEIL C.

TELEPHONE LOUD-SPEAKER SYSTEM

U.S. Pat. No. 4,104,485

A telephone loud-speaker system for use with a telephone having a handset includes a chassis with a cradle for receiving the handset. The cradle is movable between a first position whereat the telephone's switch buttons are depressed, and a second position allowing the switch buttons to raise and actuate the telephone's electrical circuitry. Microphone, speaker and amplification devices permit use of the system without removing the handset from the cradle, without modification to telephone, and without requiring additional counter space.

SUMMARY OF THE INVENTION

A primary object of the present invention is to provide an inmate phone that will overcome the shortcomings of the prior art devices.

Another object is to provide an inmate phone in which a conventional telephone handset and handset cord are permanently mounted within the housing with the earpiece and mouthpiece of the telephone handset extending through the housing to serve as a hands free telephone for safety, whereby the inmates within a prison can no longer hang themselves with the handset cord or break the handset cord off and use the telephone handset as a weapon.

An additional object is to provide an inmate phone that will reduce repair by eliminating the need to fix and replace the telephone handset, thereby saving money for the cost of maintenance thereof.

A further object is to provide an inmate phone that is simple and easy to use.

A still further object is to provide an inmate phone that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of an interior portion of a prison, showing the present invention mounted into a wall thereof.

FIG. 2 is a front perspective view taken in the direction of arrow 2 in FIG. 1.

FIG. 5 is a front elevational view, showing diagrammatically another way of using a sound increasing and decreasing system in the present invention.

Similar reference characters denote corresponding features consistently throughout the attached drawings.

DETAILED DESCRIPTION OF THE PREFERRED EMBODIMENTS

Figure 3:
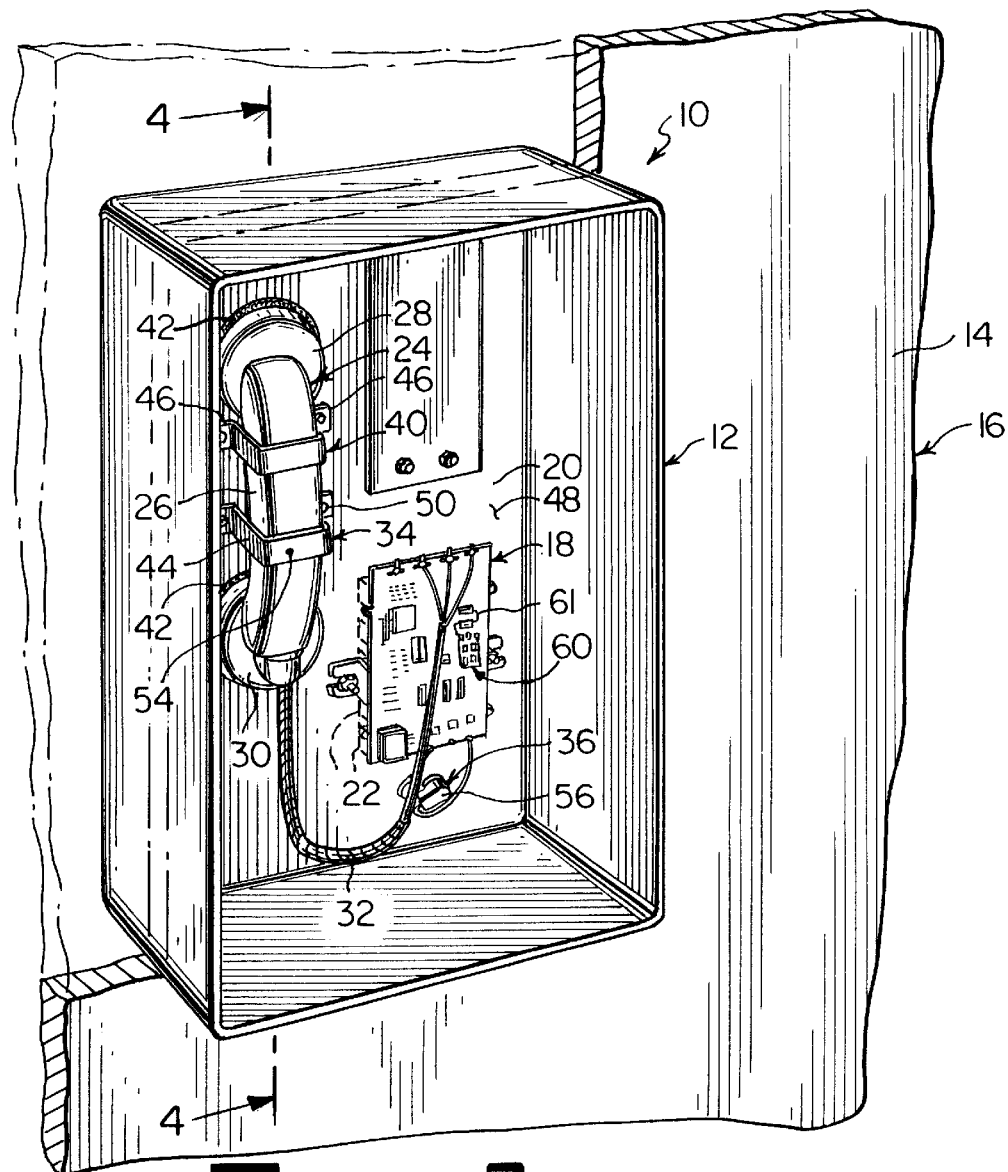
FIG. 3 is a rear perspective view taken in the direction of arrow 3 in FIG. 1.
Figure 4:
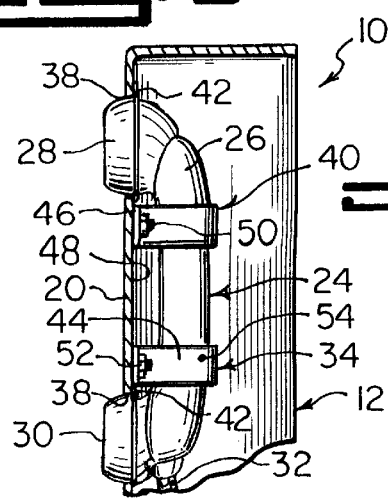
FIG. 4 is a cross sectional view with parts broken away, taken along line 4—4 in FIG. 3.

Turning now descriptively to the drawings, in which similar reference characters denote similar elements throughout the several views, FIGS. 1 through 5 illustrate the present invention being an inmate phone 10. With regard to the reference numerals used, the following numbering is used throughout the various drawing figures.

10 inmate phone
12 housing of 10
14 interior wall of 16
16 prison
18 push-button dialing pad of 10
20 front wall of 10
22 push-button digit of 18
24 telephone handset of 10
26 handle of 24
28 earpiece of 24
30 mouthpiece of 24
32 handset cord of 10
34 permanently mounting facility for 24 in 12
36 dial tone actuating component of 10
38 aperture in 12
40 bracket assembly of 34
42 annular seal of 34
44 U-shaped clamp strap of 40
46 flange of 40 on 44
48 interior surface of 20
50 threaded shank of 40
52 nut of 40
54 strong durable material for 44 and 46
56 on/off push-button switch for 36
58 phone line in 14
60 sound increasing and decreasing system of 10
61 amplifier of 60 in 18
62 volume control circuit of 60 in 56
64 rotatable control knob of 62
66 amplifier The inmate phone 10 is of the type having a housing 12 in an interior wall 14 of a prison 16. A push-button dialing pad 18 is mounted within a front wall 20 of the housing 12 with the push-button digits 22 of the push-button dialing pad 18 extending out of the front wall 20. A telphone handset 24 is provided, being a handle 26 with an earpiece 28 at one end and a mouthpiece 30 at an opposite end. A handset cord 32 is electrically connected between the push-button dialing pad 18 and the telephone handset 24.

The improvement comprises a facility 34 for premanently mounting the telephone handset 24 vertically within the front wall 20 of the housing 12, so that the earpiece 28 positioned at top and the mouthpiece 30 positioned at bottom will permanently extend out through the front wall 20 of the housing 12 to be used by inmates within the prison 16 hands free. The handset cord 32 is also permanently maintained within the housing 12, to prevent the inmates from having direct access t the telephone handset 24 and the handset cord 32, in which the inmates can no longer hang themselves with the handset cord 32 and break the handset cord 32 off and use the telephone handset 24 as a weapon. The improvement further comprises a component 36 extending through the front wall 20 of the housing 12, for manually actuating the dial tone of the inmate phone 10 independently of the telephone handset 24.

The permanent mounting facility 34 for the telephone handset 24 includes the housing 12 having two vertically spaced apart apertures 38 through the front wall 20 thereof. At least one bracket assembly 40 is secured within the front wall 20 of the housing 12, for permanently retaining the earpiece 28 and the mouthpiece 30 of the telephone handset 24 through the two vertically spaced apart apertures 38 in the front wall 20 of the housing 12. A pair of annular seals 42 are provided. Each annular seal 42 extends about the earpiece 28 and the mouthpiece 30 of the telephone handset 24 within the two vertically spaced apart apertures 38 in the front wall 20 of the housing 12.

The at least one bracket assembly 40 consists of a U-shaped clamp strap 44 being of a size to fit about the handle 26 of the telephone handset 24. A pair of flanges 46 are provided. Each flange 46 having a hole therethrough is integral with and extends outwardly from one free end of the U-shaped clamp strap 44. The flanges 46 can rest against an interior surface 48 of the front wall 20 of the housing 12. A pair of threaded shanks 50 are also provided. Each threaded shank 50 is affixed at one end to the interior surface 48 of the front wall 20 of the housing 12, so as to extend through one hole in one flange 46.

A pair of nuts 52 are also utilized. Each nut 52 is threaded onto one threaded shank 50, to hold one flange 46 securely to the interior surface 48 of the front wall 20 of the housing 12, so that the U-shaped clamp strap 44 over the handle 26 will keep the telephone handset 24 permanently in place within the housing 12. The U-shaped clamp strap 44 and the flanges 46 are fabricated out of a strong durable material 54. The strong durable material 54 can be metal or plastic. The dial tone actuating component 36 is a momentary on/off push-button switch 56 mounted through the front wall 20 of the housing 12 and is electrically connected between a phone line 58 in the interior wall 14 of the prison 16, the push-button dialing pad 18 and the telephone handset 24.

A system 60, as shown in FIGS. 3 and 5, can be electrically connected to the telephone handset 24 for increasing and decreasing sound coming out of the earpiece 28 and sound going into the mouthpiece 30 of the telephone handset 24. The sound increasing and decreasing system 60 in FIG. 3, is an amplifier 61 built into the push-button dialing pad 18 of the inmate phone 10.

The sound increasing and decreasing system 60 in FIG. 5, consists of the momentary on/off push-button switch 56 having a built-in volume control circuit 62 with a rotatable control knob 64. An amplifier 66 is electrically connected between the volume control circuit 62 and the telephone handset 24. When the control knob 64 is manually rotated in a clockwise direction, the sound coming out of the earpiece 28 and the sound going into the mouthpiece 30 will be increased. When the control knob 64 is manually rotated in a counterclockwise direction, the sound coming out of the earpiece 28 and the sound going into the mouthpiece 30 will be decreased.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An inmate phone of the type having a housing in an interior wall of a prison, a push-button dialing pad mounted within a front wall of the housing with the push-button digits of the push-button dialing pad extending out of the front wall, a telephone handset being a handle with an earpiece at one end and a mouthpiece at an opposite end, a handset cord electrically connected between the push-button dialing pad and the telephone handset, wherein the improvement comprises means for permanently mounting the telephone handset vertically within the front wall of the housing, so that the earpiece positioned at top and the mouthpiece positioned at bottom will permanently extend out through the front wall of the housing to be used by inmates within the prison hands free while the handset cord is also permanently maintained within the housing, to prevent the inmates from having direct access to the telephone handset and the handset cord, in which the inmates can no longer hang themselves with the handset cord and break the handset cord off and use the telephone handset as a weapon.

2. An inmate phone as recited in claim 1, wherein the improvement further comprises means extending through the front wall of the housing, for manually actuating the dial tone of the inmate phone independently of the telephone handset.

3. An inmate phone as recited in claim 1, wherein said permanently mounting means for the telephone handset includes:
   a) the housing having two vertically spaced apart apertures through the front wall thereof;
   b) at least one bracket assembly secured within the front wall of the housing, for permanently retaining the earpiece and the mouthpiece of the telephone handset through said two vertically spaced apart apertures in the front wall of the housing; and
   c) a pair of annular seals, in which each said annular seal extends about the earpiece and the mouthpiece of the telephone handset within said two vertically spaced apart apertures in the front wall of the housing.

4. An inmate phone as recited in claim 3, wherein said at least one bracket assembly includes:
   a) a U-shaped clamp strap being of a size to fit about the handle of the telephone handset;
   b) a pair of flanges, in which each said flange having a hole therethrough is integral with and extends outwardly from one free end of said U-shaped clamp strap, so that said flanges can rest against an interior surface of the front wall of the housing;
   c) a pair of threaded shanks, in which each said threaded shank is affixed at one end to the interior surface of the front wall of the housing, so as to extend through one hole in one said flange; and
   d) a pair of nuts, in which each said nut is threaded onto one said threaded shank to hold one said flange securely to the interior surface of the front wall of the housing, so that said U-shaped clamp strap over the handle will keep the telephone handset permanently in place within the housing.

5. An inmate phone as recited in claim 4, wherein said U-shaped clamp strap and said flanges are fabricated out of a strong durable material.

6. An inmate phone as recited in claim 5, wherein said strong durable material is metal.

7. An inmate phone as recited in claim 5, wherein said strong durable material is plastic.

8. An inmate phone as recited in claim 2, wherein said dial tone actuating means includes a momentary on/off push-button switch mounted through the front wall of the housing and electrically connected between a phone line in the interior wall of the prison, the push-button dialing pad and the telephone handset.

9. An inmate phone as recited in claim 8, further including means electrically connected to the telephone handset for increasing and decreasing sound coming out of the earpiece and sound going into the mouthpiece of the telephone handset.

10. An inmate phone as recited in claim 9, wherein said sound increasing and decreasing means is an amplifier built into the push-button dialing pad.

11. An inmate phone as recited in claim 9, wherein said sound increasing and decreasing means includes:
    a) said momentary on/off push-button switch having a built-in volume control circuit with a rotatable control knob; and
    b) an amplifier electrically connected between said volume control circuit and the telephone handset, so that when said control knob is manually rotated in a clockwise direction the sound coming out of the earpiece and the sound going into the mouthpiece will be increased, and when said control knob is manually rotated in a counterclockwise direction the sound coming out of the earpiece and the sound going into the mouthpiece will be decreased.

12. An inmate phone of the type having a housing in an interior wall of a prison, a push-button dialing pad mounted within a front wall of the housing with the push-button digits of the push-button dialing pad extending out of the front wall, a telephone handset being a handle with an earpiece at one end and a mouthpiece at an opposite end, a handset cord electrically connected between the push-button dialing pad and the telephone handset, wherein the improvement comprises:
    a) means for permanently mounting the telephone handset vertically within the front wall of the housing, so that the earpiece positioned at top and the mouthpiece positioned at bottom will permanently extend out through the front wall of the housing to be used by inmates within the prison hands free while the handset cord is also permanently maintained within the housing, to prevent the inmates from having direct access to the telephone handset and the handset cord, in which the inmates can no longer hang themselves with the handset cord and break the handset cord off and use the telephone handset as a weapon; and
    b) means extending through the front wall of the housing, for manually actuating the dial tone of the inmate phone independently of the telephone handset.

13. An inmate phone as recited in claim 12, wherein said permanently mounting means for the telephone handset includes:
   a) the housing having two vertically spaced apart apertures through the front wall thereof;
   b) at least one bracket assembly secured within the front wall of the housing, for permanently retaining the earpiece and the mouthpiece of the telephone handset through said two vertically spaced apart apertures in the front wall of the housing; and
   c) a pair of annular seals, in which each said annular seal extends about the earpiece and the mouthpiece of the telephone handset within said two vertically spaced apart apertures in the front wall of the housing.

14. An inmate phone as recited in claim 13, wherein said at least one bracket assembly includes:
   a) a U-shaped clamp strap being of a size to fit about the handle of the telephone handset;
   b) a pair of flanges, in which each said flange having a hole therethrough is integral with and extends outwardly from one free end of said U-shaped clamp strap, so that said flanges can rest against an interior surface of the front wall of the housing;
   c) a pair of threaded shanks, in which each said threaded shank is affixed at one end to the interior surface of the front wall of the housing, so as to extend through one hole in one said flange; and
   d) a pair of nuts, in which each said nut is threaded onto one said threaded shank to hold one said flange securely to the interior surface of the front wall of the housing, so that said U-shaped clamp strap over the handle will keep the telephone handset permanently in place within the housing.

15. An inmate phone as recited in claim 14, wherein said U-shaped clamp strap and said flanges are fabricated out of a strong durable material.

16. An inmate phone as recited in claim 15, wherein said strong durable material is metal.

17. An inmate phone as recited in claim 15, wherein said strong durable material is plastic.

18. An inmate phone as recited in claim 15, wherein said dial tone actuating means includes a momentary on/off push-button switch mounted through the front wall of the housing and electrically connected between a phone line in the interior wall of the prison, the push-button dialing pad and the telephone handset.

19. An inmate phone as recited in claim 18, further including means electrically connected to the telephone handset for increasing and decreasing sound coming out of the earpiece and sound going into the mouthpiece of the telephone handset.

20. An inmate phone as recited in claim 19, wherein said sound increasing and decreasing means is an amplifier built into the push-button dialing pad.

21. An inmate phone as recited in claim 19, wherein said sound increasing and decreasing means includes:
   a) said momentary on/off push-button switch having a built-in volume control circuit with a rotatable control knob; and
   b) an amplifier electrically connected between said volume control circuit and the telephone handset, so that when said control knob is manually rotated in a clockwise direction the sound coming out of the earpiece and the sound going into the mouthpiece will be increased, and when said control knob is manually rotated in a counterclockwise direction the sound coming out of the earpiece and the sound going into the mouthpiece will be decreased.

\* \* \* \* \*